United States Patent
Onji et al.

(10) Patent No.: US 11,667,220 B2
(45) Date of Patent: Jun. 6, 2023

(54) SEAT

(71) Applicant: DELTA KOGYO CO., LTD., Hiroshima (JP)

(72) Inventors: Atsushi Onji, Hiroshima (JP); Masanao Matsuura, Hiroshima (JP); Mizuki Kato, Hiroshima (JP)

(73) Assignee: DELTA KOGYO CO., LTD., Hiroshima (JP)

( * ) Notice: Subject to any disclaimer, the term of this patent is extended or adjusted under 35 U.S.C. 154(b) by 0 days.

(21) Appl. No.: 17/634,700

(22) PCT Filed: Aug. 14, 2020

(86) PCT No.: PCT/JP2020/030902
§ 371 (c)(1),
(2) Date: Feb. 11, 2022

(87) PCT Pub. No.: WO2021/044832
PCT Pub. Date: Mar. 11, 2021

(65) Prior Publication Data
US 2022/0289083 A1     Sep. 15, 2022

(30) Foreign Application Priority Data
Sep. 3, 2019 (JP) .............................. JP2019-160704

(51) Int. Cl.
*B60N 2/28* (2006.01)
*B60N 2/60* (2006.01)

(52) U.S. Cl.
CPC ......... *B60N 2/2893* (2013.01); *B60N 2/6009* (2013.01)

(58) Field of Classification Search
CPC .. B60N 2/2893; B60N 2/5841; B60N 2/6009; B60N 2/2887
(Continued)

(56) References Cited

U.S. PATENT DOCUMENTS 7,281,763 B1 * 10/2007 Hayashi ............... B60N 2/5816
297/253
9,656,577 B2 * 5/2017 Sekino ................... B60N 2/289
(Continued)

FOREIGN PATENT DOCUMENTS

DE    10 2009 018651 A1    10/2010
JP    2007-131199 A    5/2007
(Continued)

OTHER PUBLICATIONS

The extended European search report issued by the European Patent Office dated Aug. 5, 2022, which corresponds to European Patent Application No. 20860283.9-1012 and is related to U.S. Appl. No. 17/634,700.
(Continued)

*Primary Examiner* — Mark R Wendell
(74) *Attorney, Agent, or Firm* — Studebaker & Brackett PC (57) ABSTRACT

A seat capable of suppressing wrinkles around an opening of a curved-surface-portion of a skin. The seat comprises: a skin in which a curved opening is formed in the curved-surface-portion; an elastically deformable plate-shaped reinforcing-member that reinforces a peripheral portion of the opening, the reinforcing-member being disposed in a curved state along an inner surface of the curved-surface-portion; and a pressing-member that covers the peripheral portion of the opening in a state where the pressing-member presses the peripheral portion of the opening from an outer surface of the curved-surface-portion. The reinforcing-member has a main-body-portion overlapping with the pressing-ember, and extending-portions respectively extending from side edges of the main-body-portion to a range not overlapping with the pressing-member. A slit is formed in each of the extending-portions. The slits extend in a direction that a portion disposed outside in the width direction of the extend-
(Continued)

ing-portion is elastically deformable independently from the main-body-portion.

20 Claims, 8 Drawing Sheets

(58) Field of Classification Search
USPC .......................................................... 297/253
See application file for complete search history.

(56) References Cited

U.S. PATENT DOCUMENTS

| | | | | |
|---|---|---|---|---|
| 10,343,561 B2* | 7/2019 | Terada | ...................... | B60N 2/64 |
| 11,007,909 B2* | 5/2021 | Styn | ...................... | B60N 2/6009 |
| 11,046,216 B2* | 6/2021 | Parmar | ................ | B60N 2/6009 |
| 11,124,096 B2* | 9/2021 | Onji | .......................... | B60N 2/58 |
| 2002/0104190 A1* | 8/2002 | Moore | ................. | B60N 2/2809 |
| | | | | 16/231 |
| 2007/0257541 A1 | 11/2007 | Browne et al. | | |
| 2015/0084388 A1* | 3/2015 | Arai | ..................... | B60N 2/2887 |
| | | | | 297/250.1 |
| 2016/0107553 A1 | 4/2016 | Imajo | | |
| 2016/0200224 A1* | 7/2016 | Fujikake | ................ | B60N 2/286 |
| | | | | 297/452.38 |
| 2017/0259710 A1* | 9/2017 | Oga | .......................... | B60N 2/58 |
| 2017/0355286 A1* | 12/2017 | Terada | ...................... | B60N 2/70 |
| 2018/0257520 A1 | 9/2018 | Shirai et al. | | |
| 2018/0361890 A1* | 12/2018 | Ishizaka | ............... | B60N 2/2887 |

FOREIGN PATENT DOCUMENTS

| | | |
|---|---|---|
| JP | 2009-137520 A | 6/2009 |
| JP | 2011-068200 A | 4/2011 |
| JP | 2016-078627 A | 5/2016 |
| JP | 2017-190094 A | 10/2017 |
| JP | 2018-079708 A | 5/2018 |
| JP | 2018-149881 A | 9/2018 |
| WO | 2016/021622 A1 | 2/2016 |

OTHER PUBLICATIONS

International Search Report issued in PCT/JP2020/030902; dated Oct. 13, 2020.

* cited by examiner

SEAT

TECHNICAL FIELD

The present invention relates to a seat having a skin in which an opening is formed.

BACKGROUND ART

Conventionally, a vehicle seat or the like having a skin in which an opening is Conned for various purposes has been used.

For example, Patent Literature 1 discloses a seat having a skin in which a rectangular opening for ventilation of a cabin is formed on a wall, extending in a substantially vertical direction, of a side seat disposed adjacently to a seat back. In this seat, in order to suppress generation of wrinkles at a portion around the opening of the skin, a bezel is attached to the periphery of the opening of the skin from the outside of the skin, and a resin plate is attached to the inside of the opening from the inside of the skin. The bezel and the resin plate respectively have a planar rectangular frame shape so as to be brought into contact with the peripheral area of the opening formed in a planar portion of the skin.

In this configuration, as the resin plate presses the skin from the inside, even when the bezel presses the skin from the outside, sinking of the skin inward is suppressed so that the generation of wrinkles in the skin is suppressed.

In recent years, among a seat having skin in which an opening is formed, there has been proposed a seat having a configuration where an opening is formed in a curved surface portion of a skin.

For example, in a seat having a structure capable of being attached with a child seat adopting international standard fixing system the so-called ISOFIX, in order to connect a connector provided at a rear end of the ISOFIX child seat to the vehicle seat, an opening for inserting the connector is provided at a curved portion raised in a columnar shape at a rear end of a seat cushion. In such a seat, a curved opening is formed in a curved surface portion of the skin. For holding a peripheral area of the curved opening, it is necessary to press the skin from the outside by a curved bezel in a state where a resin plate is brought into contact with the curved surface portion of the skin from the inside.

However, when the skin is pressed by the bezel from the outside of the curved surface portion of the skin, the whole resin plate sinks along the bezel so that a portion thereof is apart from the curved surface portion of the skin. Accordingly, it is difficult to lay the resin plate along a curved surface of the curved surface portion. As a result, it is difficult to suppress the generation of wrinkles around the opening of the curved surface portion of the skin.

CITATION LIST

Patent Literature

Patent Literature 1: JP 2017-190094 A

SUMMARY OF INVENTION

An object of the present invention is to provide a seat capable of suppressing generation of wrinkles around an opening of a curved surface portion of a skin.

To solve thereabove problems, a seat of the present invention includes: a skin which has a curved surface portion at least at a part thereof and in which an opening curved in a predetermined curved direction along the curved surface portion is formed at the curved surface portion; an elastically deformable plate-shaped reinforcing member which reinforces a peripheral area of the opening at the curved surface portion, the reinforcing member being disposed in a curved state along an inner surface of the curved surface portion; and a pressing member which covers the peripheral area of the opening in a pressing state from an outer surface of the curved surface portion, wherein the reinforcing member includes a main body portion Which overlaps with the pressing member and sandwiches the skin in cooperation with the pressing member, and an extending portion which is connected to at least one side edge of the main body portion in a width direction orthogonal to the curved direction and extends in a range not overlapping with the pressing member, a slit is formed in the extending portion, and the slit extends in the curved direction such that a part of the extending portion on an outer side in the width direction is elastically deformable independently from the main body portion.

DESCRIPTION OF EMBODIMENTS

Hereinafter, a preferred embodiment of the present invention is described in detail with reference to attached drawings.

(Overall Description of Seat 1)

Figure 1:
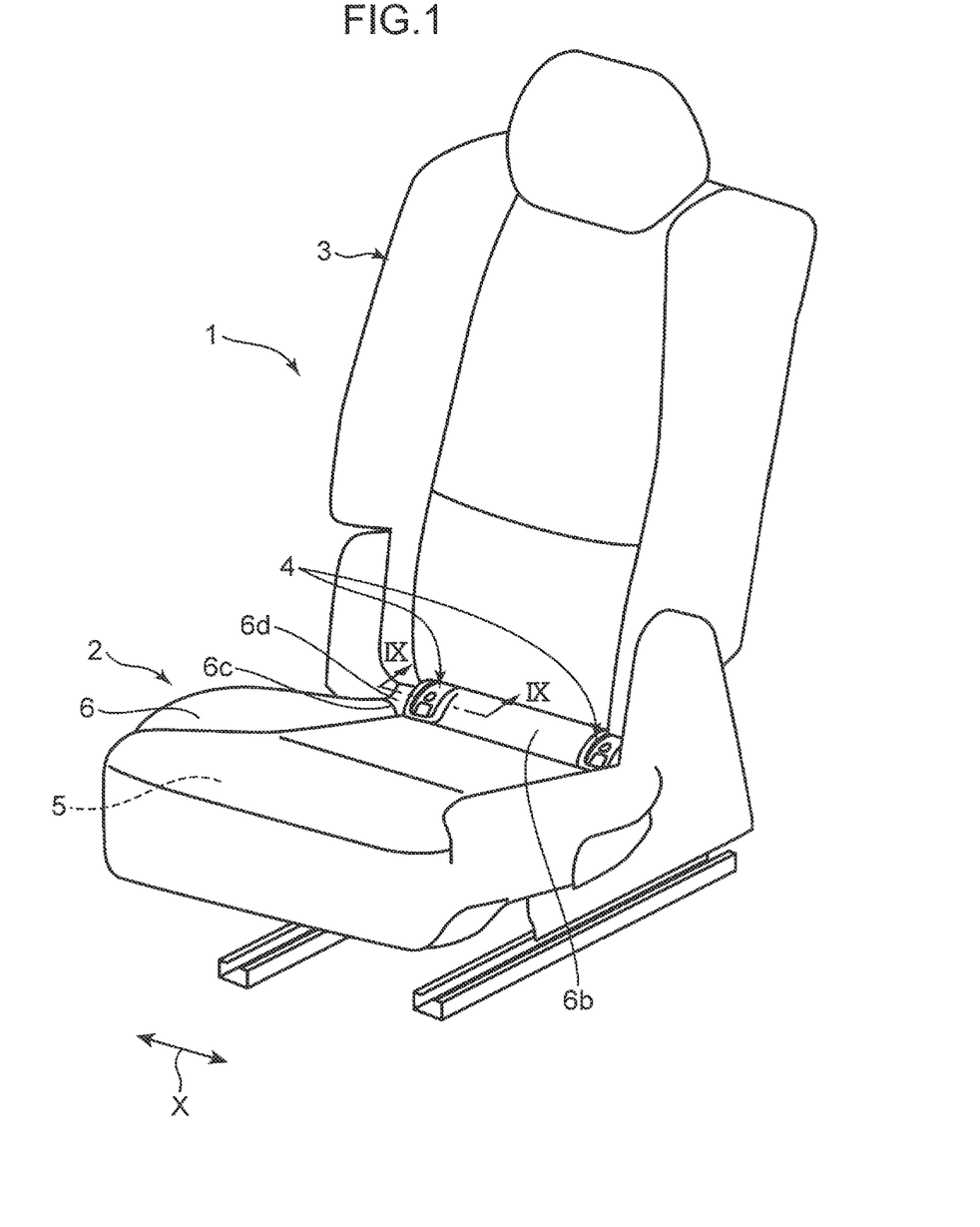
FIG. 1 is a perspective view illustrating an overall configuration of a seat cording to an embodiment of the present invention.

A seat 1 illustrated in FIG. 1 is a seat used for a passenger seat, a rear seat, or the like of an automobile, and the seat 1 has a structure capable of being attached with a child seat adopting the ISOFIX system in a detachable manner. That is, in a seat structure including a seat cushion 2 as a seat portion and a seat back 3 as a backrest, the seat 1 includes, or a the seat cushion 2 side: a pad 5 (see FIG. 9); a skin 6 having a shape capable of covering a surface of the pad 5; and a connector attachment portion 4 connectable to a connector (not illustrated in the drawing) of a child seat. In the present embodiment, the connector attachment portion 4 is provided at a raised portion (see a curved surface portion 6b of the skin 6) on end (an end portion on the seat back 3 side) of the seat cushion 2.

Figure 7:
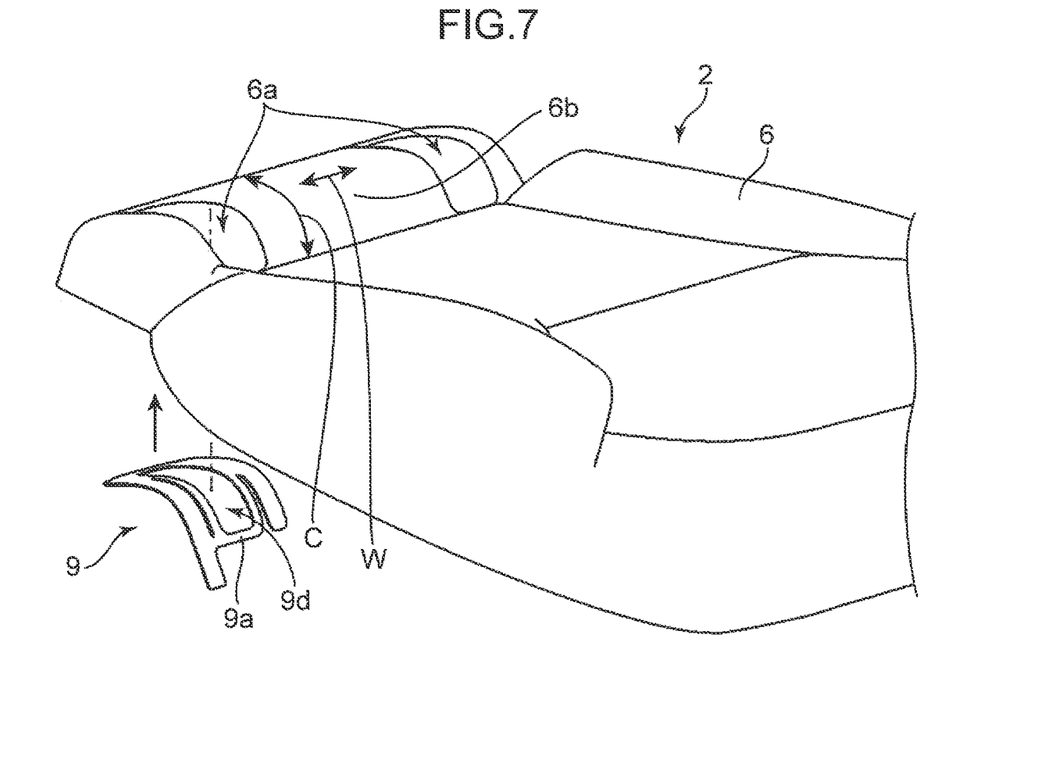
FIG. 7 is an explanatory perspective view illustrating a state immediately before the reinforcing plate of FIG. 2 is attached to the skin.

To describe the skin 6 of the seat cushion 2 more specifically, as illustrated in FIG. 7, the skin 6 has a semicircular columnar curved surface portion 6b raising upward at least at a portion thereof, specifically, in the vicinity of a rear end of the skin 6, in the curved surface portion 6b, a skin opening portion 6a which is curved in a predetermined curved direction C is formed along the curved surface portion 6b. Specifically, the skin opening portion 6a is curved so as to bulge outward within a range of from a frontward direction to an upward direction. The skin opening portion 6a is formed at positions close to bath side edges of the seat 1 (side edges 6d of the skin 6 in the width direction X of the seat 1 illustrated in FIG. 1 and FIG. 9).

Figure 9:
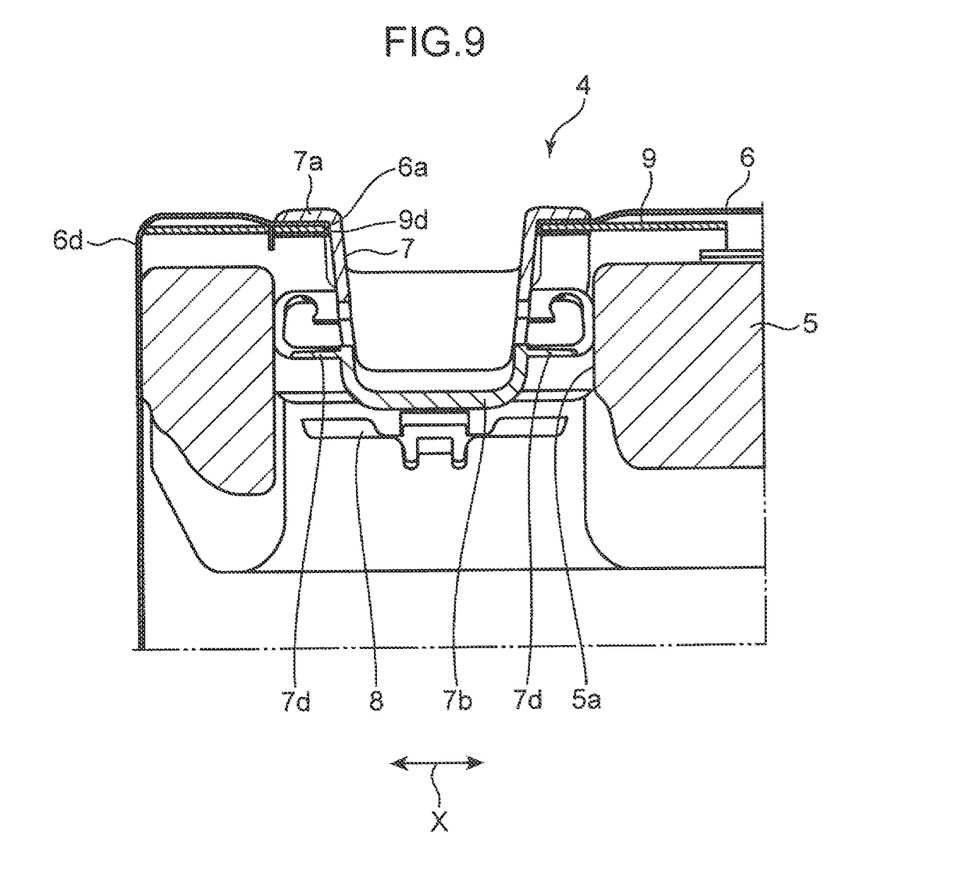
FIG. 9 is a cross-sectional view taken along line DC-IX in FIG. 1.

As illustrated in FIG. 9, the connector attachment portion 4 has a structure including a rectangular pad opening portion 5a formed in the pad 5 and the skin opening portion 6a formed in the skin 6 which are disposed so as to communicate with each other, and a U-shaped metal bar 10 (see FIG. 2) as a portion to be engaged with which a connector of a child seat is engageable inside the pad opening portion 5a. The pad opening portion 5a and the skin opening portion 6a respectively have a size which allows the connector to pass therethrough. The metal bar 10 is disposed inside the pad opening portion 5a such that a center portion of the metal bar 10 extends in a direction transverse to the pad opening portion 5a. The metal bar 10 is connected to a metal frame (not illustrated in the drawing) which supports the pad 5 of the seat 1.

As illustrated in FIG. 2 to FIG. 6, the connector attachment portion 4 further includes: a bezel 7 that is disposed inside the pad opening portion 5a inside the skin 6 and receives the connector; a cover 8 which covers the bezel 7 from the outside; and a reinforcing plate 9 as a reinforcing member which reinforces a peripheral edge portion of the rectangular skin opening portion 6a, A specific configuration of the reinforcing plate 9 will be described in detail later.

The bezel 7 and the cover 8 are both placed inside the pad opening portion 5a (see FIG. 9) in a state where the bezel 7 and the cover 8 are connected to each other by a fastening member (not illustrated in the drawing) such as a screw.

As illustrated in FIG. 2 to FIG. 5, the bezel 7 includes a front-side contact portion 7a which is in contact with the peripheral edge portion of the skin opening portion 6a on the front side of the skin 6, and a receiving portion 7b having a shape opened obliquely forward capable of receiving the connector. Specifically, the receiving portion 7b includes a pair of side walls spaced apart from each other a width direction (the same direction as a width direction W described later) of the receiving portion 7b, a bottom wall, and a rear wall, and has a box shape which is opened in a range from a front side and an upper side. The bezel 7 of the present embodiment is formed by integrally molding the front-side contact portion 7a and the receiving portion 7b using a resin. Since the bezel 7 has the front-side contact portion 7a, the bezel 7 can function as a pressing member for pressing the skin 6 from the outside.

Figure 2:
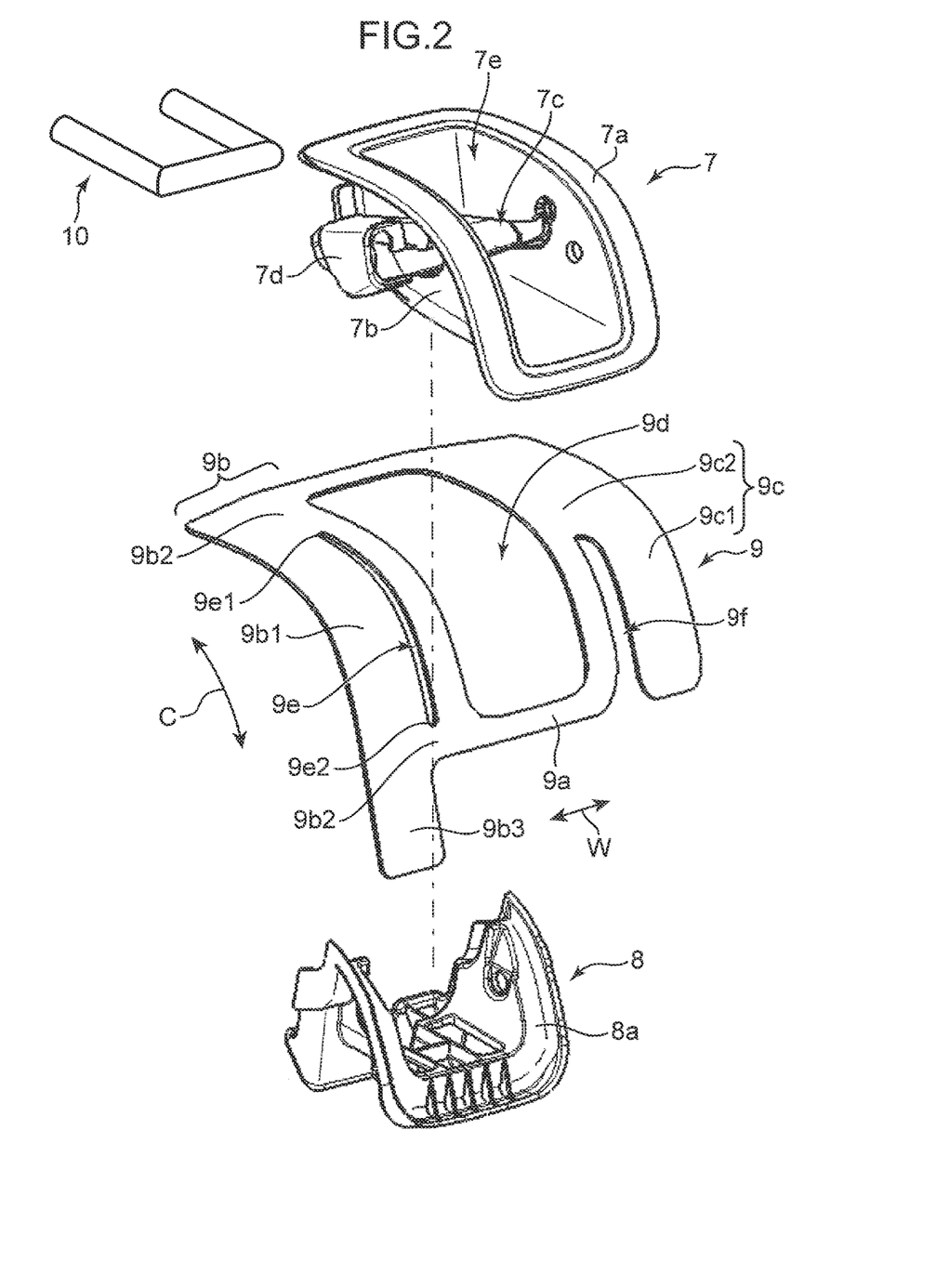
FIG. 2 is an exploded perspective view of a bezel, a reinforcing plate, and a cover constituting a connector attachment portion of FIG. 1.
Figure 3:
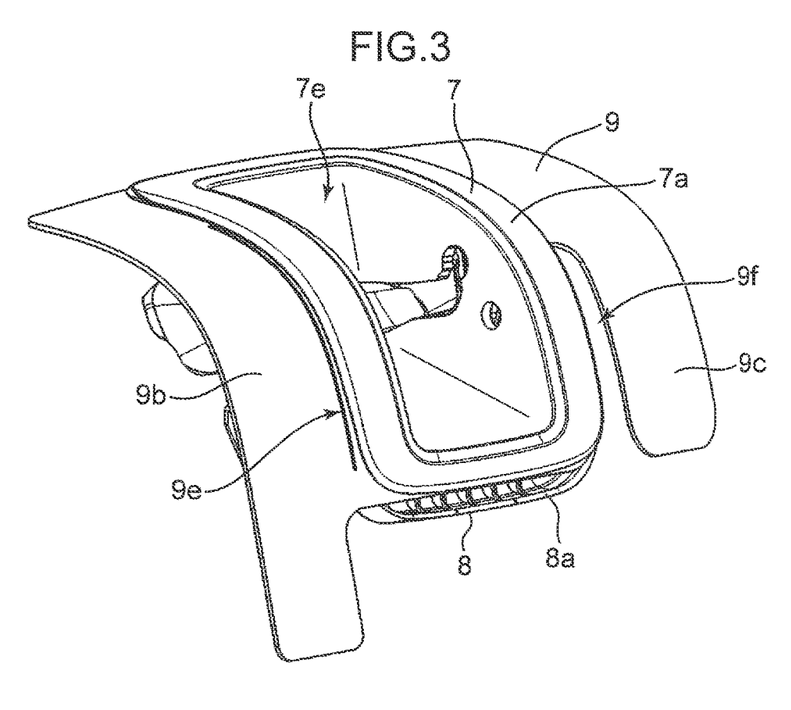
FIG. 3 is a perspective view illustrating a state in which the bezel, the reinforcing plate, and the cover of FIG. 2 are assembled together.
Figure 4:
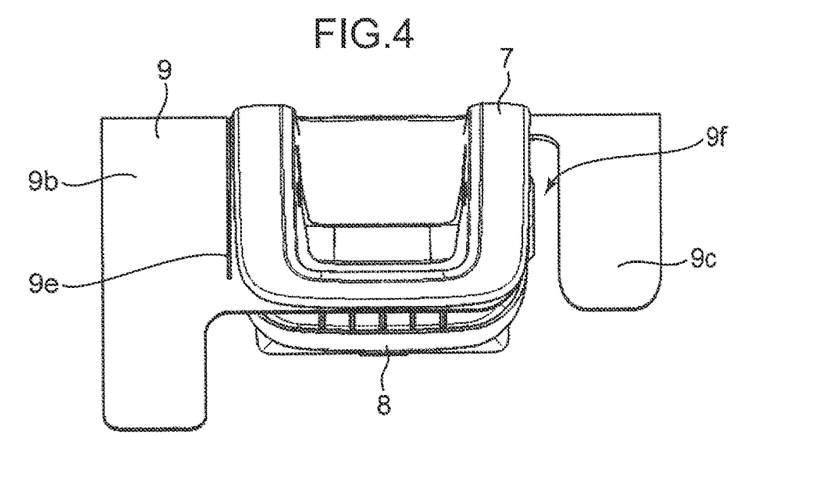
FIG. 4 is a front view illustrating a state in which the bezel, the reinforcing plate, and the cover of FIG. 2 are assembled together.
Figure 5:
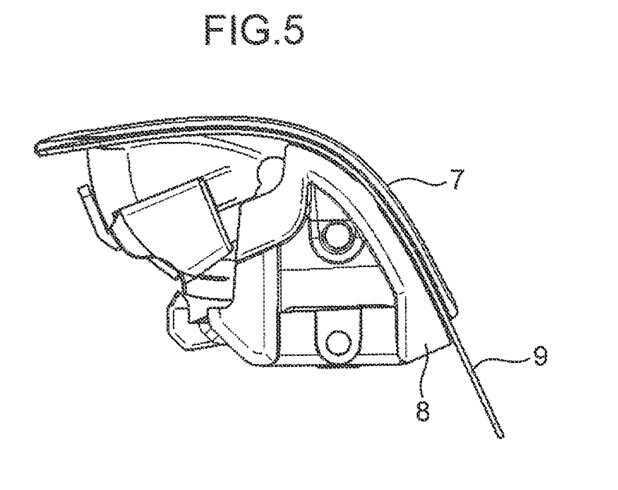
FIG. 5 is a left side view illustrating a state in which the bezel, the reinforcing plate, and the cover of FIG. 2 are assembled together.

As illustrated in FIG. 2 and FIG. 3, the receiving portion 7b has a connector insertion space 7e which opens in a range from the front side to the upper side and can receive the connector. In the receiving portion 7b, a slit 7c is formed so that a center portion of the metal bar 10 (see: FIG. 2) can protrude into the connector insertion space 7e. Further, a holding portion 7d is provided outside the receiving portion 7b for holding a pair of arm portions of the metal bar 10 (see FIG. 2).

The front-side contact portion 7a has a shape capable of coming into contact with a peripheral edge portion of the skin opening portion 6a on the front side of the skin 6. In the present embodiment, the front-side contact portion 7a has a curved rectangular shape similar to a shape of the curved rectangular peripheral edge portion of the skin opening portion 6a. Accordingly, the front-side contact portion 7a can be brought into contact with the entire circumference of the surface of the peripheral edge portion of the skin opening portion 6a.

As illustrated in FIG. 2 to FIG. 3, the cover 8 has a configuration capable of covering the receiving portion 7b of the bezel 7 from below and engaging with an outer portion of the bezel 7. Further, the cover 8 has a back-side contact portion 8a that is brought into contact with the reinforcing plate 9 on a back side of the skin 6.

Figure 8:
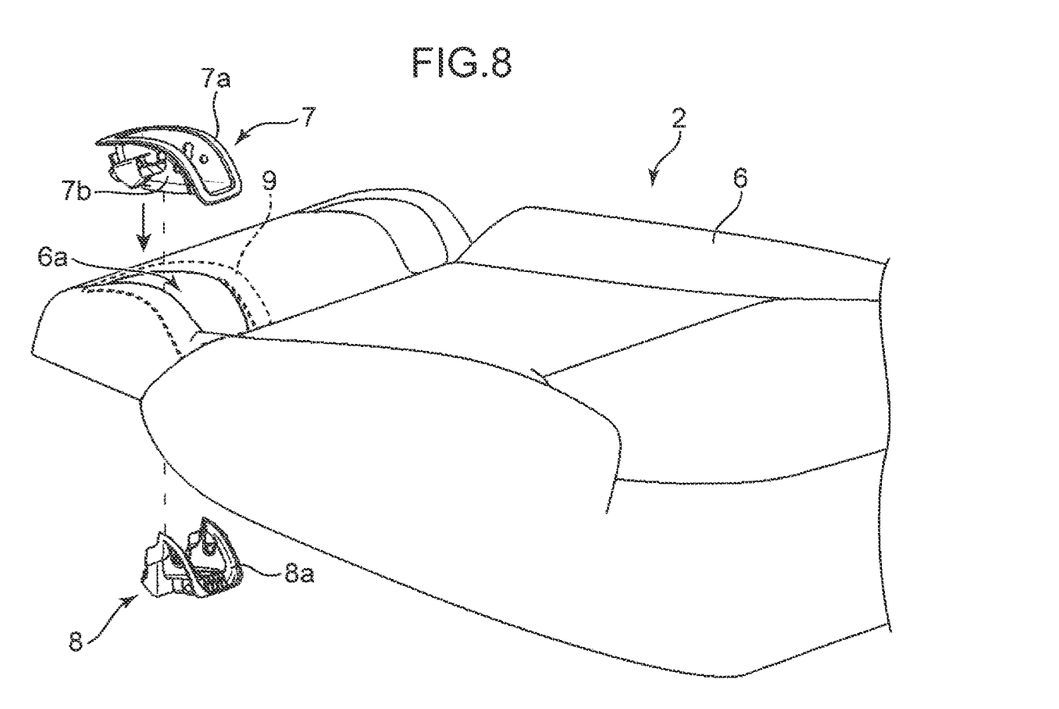
FIG. 8 is an explanatory perspective view illustrating a state immediately before the bezel is engaged with the cover so as to sandwich the skin of FIG. 7 therebetween.

As illustrated in FIG. 8, the bezel 7 is attached to the cover 8 while sandwiching the skin 6 and the reinforcing plate 9 in cooperation with the cover 8. That is, the receiving portion 7b of the bezel 7 is inserted into the skin opening portion 6a in a state where the reinforcing plate 9 is attached to the inner surface of the curved surface portion 6b of the skin 6. The receiving portion 7b of the bezel 7 engages with the cover 8 in a state where the receiving portion 7b penetrates the skin 6 and the reinforcing plate 9. In this state, as illustrated in FIG. 2 to FIG. 3, the front-side contact portion 7a of the bezel 7 covers the peripheral area of the skin opening portion 6a in a state where the front-side contact portion 7a presses the peripheral area of the skin opening portion 6a from the outer surface of the skin 6. With such a configuration, the skin 6 and the reinforcing plate 9 can be held by being sandwiched by the front-side contact portion 7a of the bezel 7 and the back-side contact portion 8a of the cover 8.

(Description of Reinforcing Plate)

As illustrated in FIG. 2 to FIG. 7, the reinforcing plate 9 is an elastically deformable plate-like member for reinforcing the peripheral area of the skin opening portion 6a in the curved surface portion 6b of the skin 6.

The reinforcing plate 9 is formed of an elastically deformable material having a bending rigidity capable of holding the shape of the curved surface portion 6b of the skin 6, For example, the reinforcing plate 9 is formed of a thermoplastic resin plate such as polypropylene.

The reinforcing late 9 is disposed so as to be curved in the curved direction C (see FIG. 7) along the inner surface of the curved surface portion 6b of the skin 6.

The reinforcing plate 9 has a main body portion 9a and extending portions 9b, 9c disposed on both sides of the main body portion 9a in a width direction W orthogonal to the curved direction C (see FIG. 7).

The main body portion 9a has a rectangular opening 9d which corresponds to the curved rectangular skin opening portion 6a. In a state where the reinforcing plate 9 is curved along the curved surface portion 6b, the opening 9d matches the skin opening portion 6a curved in the curved direction C (see FIG. 7 to FIG. 9).

Figure 6:
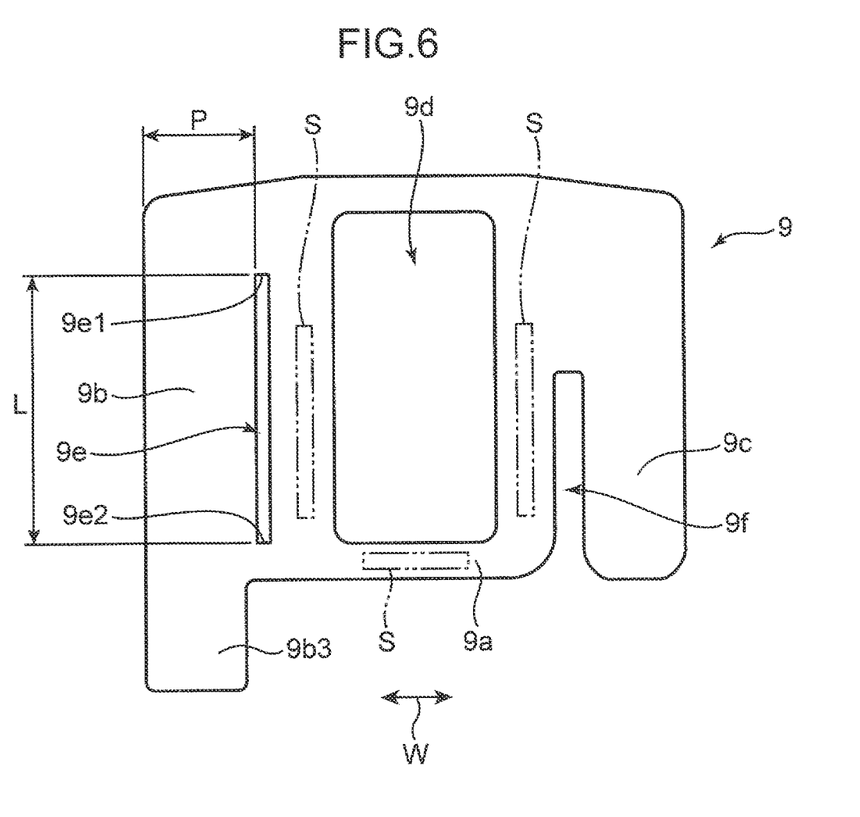
FIG. 6 is a plan view of the reinforcing plate of FIG. 2 in a state before being attached to a skin.

The main body portion 9a of the reinforcing plate 9 has a substantially rectangular shape which corresponds to the front-side contact portion 7a of the bezel 7 so as to overlap with the bezel 7 and sandwich the skin 6 in cooperation with the bezel 7. As illustrated in FIG. 6 to FIG. 8, the main body portion 9a is fixedly attached to the skin 6 by sewing or the like. Specifically, as illustrated in FIG. 6, the main body portion 9a is seamed to the skin 6 at a plurality of seamed portions S.

The extending portions 9b, 9c are connected to side edges on both sides in the width direction W of the main body portion 9a, and extend in a region not overlapping with the bezel 7. With respect to the extending portion 9b, 9c of the reinforcing plate 9, it is sufficient to provide the extending portion to at least one side edge out of both side edges of the main body portion 9a in the width direction W, and the extending portion may be provided only at a portion where the moldability of the pad 5 is poor.

A slit 9e is formed in the extending portion 9b, and a slit 9f is formed in the extending portion 9c. Because of this, as illustrated in FIG. 2, the extending portions 9b, 9c each include a portion 9b1, 9c1 disposed outside the slit 9e, 9f in the width direction W, and a connecting portion 9b2, 9c2 connecting each of the portions 9b1, 9c1 to the main body portion 9a.

The slits 9e, 9f extend in the curved direction C such that the portions 9b1, 9c1 disposed outside in the width direction W in the extending portions 9b, 9c can be elastically deformed independently from the main body portion 9a. In other words, the slits 9e, 9f extend in a direction parallel to side edges on both sides in the width direction W of the opening 9d curved in the curved direction C corresponding to the skin opening portion 6a (that is, the curved direction C).

The slits 9e, 9f separate the main body portion 9a of the reinforcing plate 9 just below the bezel 7 when being suppressed by the bezel 7 from the portions 9b1, 9c1 of the reinforcing plate 9 disposed outside the extending portions 9b, 9c extending from both sides of the bezel 7 in the width direction W. With such a configuration, the portions 9b1, 9c1 disposed outside the extending portions 9b, 9c extending from both sides of the main body portion 9a in the width direction W can be partially easily bent. Accordingly, it is possible to allow the portions 9b1, 9c1 to function as a leaf spring for supporting the curved surface portion 6b of the skin 6 from inside thereof.

With respect to the bending rigidity of the extending portions 9b, 9c, it is sufficient for the extending portions 9b, 9c to have a bending rigidity capable of generating elasticity that the curved surface portion 6b of the skin 6 can return to an original curved state by a reaction force even when an external force is applied to the extending portions 9b, 9c from the outside of the skin 6.

Out of the pair of slits 9e, 9f of the reinforcing plate 9, the slit 9e the left slit in FIG. 2 to FIG. 4, and FIG. 6) positioned in a region of the reinforcing plate 9 sandwiched between the above-mentioned side edge 6d and the skin opening portion 6a is formed such that both ends 9e1, 9e2 in the longitudinal direction of the slit 9e are closed. By forming the slit 9e in which the both ends 9e1, 9e2 are closed, the portion 9b1 of the extending portion 9b disposed on an outer side in the width direction W is brought into a so-called both end support state where both ends of the portion 9b1 are partially connected to the main body portion 9a via a pair of connecting portions 9b2, and is not connected to the main body portion 9a at portions other than the both ends. As a result, when the extending portion 9b receives a force from the outside of the skin 6, a large reaction force is generated and hence, the extending portion 9b can be made to follow the curved surface portion 6b of the skin 6.

On the other hand, by forming the slit 9f (the right slit in FIG. 2 to FIG. 4, and FIG. 6) having one end thereof opened in the extending portion 9c, the portion 9c1 disposed outside in the width direction W is brought into a cantilevered state via the connecting portion 9c2. Accordingly, the bending rigidity of the extending portion 9c is adjusted such that the extending portion 9c can be easily bent along the pad 5 (see FIG. 9). Since a portion of the pad 5 on a right side of the pad opening portion 5a illustrated in FIG. 9 has good moldability, it is unnecessary for the portion of the pad 5 to hold the shape of the curved surface portion 6b of the skin 6 using the reaction force of the reinforcing plate 9, and it is possible to obtain an aesthetic external appearance shape by pressing the pad 5 against the skin 6 side.

The pair of slits 9e, 9f of reinforcing plate 9 is formed at positions adjacent to a peripheral edge of the bezel 7 overlapping with the main body portion 9a of the reinforcing plate 9.

As illustrated in FIG. 9, a peripheral edge portion of the opening portion 6a which constitutes the skin opening portion 6a of the skin 6 may be wound inside the opening 9d of the reinforcing plate 9.

Features of Present Embodiment (1) In the seat 1 of the present embodiment, the skin opening portion 6a which is curved in the predetermined curved direction C along the curved surface portion 6b is formed in the curved surface portion 6b of the skin 6. The elastically deformable plate-shaped reinforcing plate 9 includes: the main body portion 9a overlapping with the bezel 7 and sandwiching the skin 6 in cooperation with the bezel 7; and the extending portions 9b, 9c connected to the side edges of the main body portion 9a in the width direction W orthogonal to the curved direction C and extending in a range not overlapping with the bezel 7. The slits 9e, 9f are formed in the extending portions 9b, 9c respectively. The slits 9e, 9f extend in the curved direction C such that the portions 9b1, 9c1 disposed outside in the width direction W in the extending portions 9b, 9c can be elastically deformed independently from the main body portion 9a.

Accordingly, the extending portions 9b, 9c of the reinforcing plate 9 are elastically deformable independently from the main body portion. 9a by these slits 9e, 9f. As a result, the extending portions 9b, 9c of the reinforcing plate 9 can easily follow the curved surface portion 6b of the skin 6. Accordingly, the extending portions 9b, 9c push the curved surface portion 6b outward along the curved surface portion 6b of the skin 6 and hence, the generation of winkles in the curved surface portion 6b can be suppressed.

In other words, when the slits 9e, 9f are not formed in the reinforcing plate 9, the reinforcing plate 9 has high rigidity; hence, the reinforcing plate 9 is hard to follow the skin 6, and the reinforcing plate 9 is curved along the shape of the bezel 7. Accordingly, the reinforcing plate 9 does not follow the skin 6, which results in a negative impact such as generation of wrinkles on the external appearance of the skin 6 around the bezel 7. On the other hand, by forming the slits 9e, 9f in the reinforcing plate 9 as in the case of the present embodiment, the rigidity of the extending portions 9b, 9c disposed outside the slits 9e, 9f is partially lowered to make the extending portions 9b, 9c easily follow the skin 6. By forming the slits 9c, 9f in this manner, a reaction force is generated in the extending portions 9b, 9e, and the reaction force can make the extending portions 9b, 9c disposed outside the slits 9e, 9f to follow the skin 6. Even when an external force is applied to the curved surface portion 6b of the skin 6 and the curved surface portion 6b is deformed, the curved surface portion 6b can return to the original shape by the reaction force of the extending portions 9b, 9c of the reinforcing plate 9.

(2) In the seat 1 of the present embodiment, the reinforcing plate 9 is made of a thermoplastic resin plate; hence, the reinforcing plate 9 is easily bent along the curved surface portion 6b of the skin 6 and has the bending rigidity capable of pushing the curved surface portion 6b outward. In other words, the reinforcing plate 9 made of a thermoplastic resin plate is easy to bend, has rigidity, and is bent appropriately and hence, the reinforcing plate 9 can obtain an advantage of being easy to follow the curved surface portion 6b of the skin 6.

The reinforcing member of the present invention may not be limited to the above-mentioned reinforcing plate 9 made of a thermoplastic resin plate as long as it is elastically deformable and can be made to follow the curved surface portion 6b of the skin 6.

(3) In the seat 1 of the present embodiment, the skin opening portion. 6a is formed at a position close to the side edge of the seat 1 (specifically, the side edge 6d of the skin 6 in the width direction X of the seat 1 illustrated in FIG. 1 and FIG. 9). The slit 9e is formed such that both ends of the slit 9e in the longitudinal direction are closed, within a range of the reinforcing plate 9 sandwiched between the side edge of the seat 1 (that is, the side edge 6d of the skin 6) and the skin opening portion 6a.

When the skin opening portion 6a of the skin 6 is formed at a position close to the side edge of the seat as described above, in a narrow range sandwiched between the skin opening portion 6a and the side edge of the seat, wrinkles tend to be easily generated in the skin 6 due to poor moldability of a coating target (pad or the like) covered with the skin 6. Accordingly, as described above, in the range of the reinforcing plate 9 sandwiched between the side edge of the seat and the skin opening portion 6a, the slit 9e is formed such that both ends of the slit 9e in the longitudinal direction are closed, and hence, the extending portion 9b of the reinforcing plate 9 is supported by the main body portion 9a at two portions close to both ends of the slit 9e (that is, supported at both ends thereof). With such a configuration, the bending rigidity of the extending portion 9b is increased, and it is possible to surely suppress the generation of wrinkles within the range sandwiched between the skin opening portion 6a of the skin 6 and the side edge of the seat.

Further, it is also possible to decrease sinking of the skin 6 due to pressing from the bezel 7 within the range sandwiched between the skin opening portion 6a of the skin 6 and the side edge of the seat.

In other words, among both sides of the bezel 7, on the left side of the bezel 7 illustrated in FIG. 2 and FIG. 9 (that is, in the vicinity of the side edge of the seat, a portion where the moldability of the pad 5 is poor and wrinkles are likely to occur in the skin 6), the slit 9e is in the form of a slit with both ends closed and hence, the bending rigidity (spring property) of the extending portion 9b protruding to the left side of the bezel 7 is increased.

Particularly, when the skin opening portion 6a is provided at a position close to the side edge of the seat, wrinkles are likely to occur in the skin 6 in a narrow region sandwiched between the skin opening portion 6a and the side edge of the seat, and the skin 6 is likely to appear to sink downward. However, it is possible to achieve both reduction of wrinkles and prevention of sinking in the skin 6 by the slit 9e with both ends closed.

As illustrated in FIG. 6, a length L of the slit 9e with both ends closed is preferably set to approximately 50 mm (for example, 40 mm to 60 mm). By forming the slit 9e having such a length, the extending portion 9b is surely deformed to follow the curved surface portion 6b of the skin 6, and can obtain the bending rigidity capable of preventing the generation of wrinkles with certainty by pushing the curved surface portion 6b of the skin 6 outward.

Further, when a width P of the portion 9b1 of the extending portion 9b disposed on the outer side in the width direction is approximately 18 mm (for example, 14 mm to 22 mm), it is possible to surely prevent the occurrence of wrinkles in the skin 6 within the above-mentioned range near the bezel 7, thus contributing to the enhancement of the external appearance of the skin 6. Further, it is preferable to set the width P of the extending portion 9b close to the side edge of the seat 1 to approximately 18 mm since the extending portion 9b is not brought into contact with the inner cover or the like constituting the inner side of the skin 6.

(4) In the seat 1 of the present embodiment, the slits 9e, 9f are formed at positions adjacent to the peripheral edges of the bezel 7 overlapping with the main body portion 9a of the reinforcing plate 9. In this configuration, as the slits 9e, 9f are formed at positions adjacent to the peripheral edges of the bezel 7, it is possible to decrease the distances between the peripheral edges of the bezel 7 and the portions of the curved surface portion 6b of the skin 6 which are pushed outward by the extending portions 9b, 9c. With such a configuration, it is possible to enhance the external appearance of the skin 6 by eliminating the portion where the reinforcing plate 9 does not follow the skin 6.

(5) In the seat 1 of the present embodiment, the extending portions 9b, 9c of the reinforcing plate 9 extend from the side edges on both sides in the width direction W of the main body portion 9a, and are elastically deformable independently from the main body portion 9a by the slit 9e formed between the extending portions 9b and the main body portion 9a and the slit 9f formed between the extending portion 9c and the main body portion 9a. Accordingly, it is possible to suppress the generation of wrinkles in the curved surface portion 6b of the skin 6 by the extending portions 9b, 9c on both sides in the width direction W of the reinforcing plate 9.

(6) In the seat 1 of the present embodiment, the main body portion 9a of the reinforcing plate 9 overlaps with the bezel 7 disposed outside the skin 6. The main body portion 9a is seamed to the skin 6 and hence, the seamed portion is covered by the bezel 7 and cannot be seen from the outside. As a result, it is possible to prevent deterioration of appearance of the skin 6.

(7) In the seat 1 of the present embodiment, the skin opening portion 6a has a size capable of allowing the insertion of a connector of a child seat. With such a configuration, it is possible to allow attachment of the child seat to the seat 1. Accordingly, it is possible to suppress the generation of wrinkles in the skin 6 around the opening of the seat 1 (that is, the skin opening portion 6a) for inserting the connector of the child seat.

(8) in the present embodiment, the portion 9b3 of the reinforcing plate 9 (see FIG. 2 and FIG. 6) extending below the extending portion 9b disposed outside the slit 9e may be seamed to the skin 6 (for example, a hanging portion 6c of the skin 6 illustrated in FIG. 1). With such a configuration, it is possible to suppress the creases in the external appearance of the skin 6 by making use of the rigidity of the reinforcing plate 9.

Modification

In the above embodiment, the description has been made by taking a seat having a structure to which an ISOFIX type child seat can be attached is described as an example of the seat having the configuration in which the opening is formed in the curved surface portion of the skin. However, the present invention is not limited to such a seat. The present invention can be widely applied to a seat provided that the seat has a configuration in which an opening is formed in a curved surface portion of a skin. According to the present invention, it is possible to suppress generation of wrinkles around the opening of the curved surface portion of the skin.

Summary of Embodiment

The above-mentioned embodiment is summarized as follows.

A seat of the present embodiment includes: a skin which has a curved surface portion at least at a portion thereof and in which an opening curved in a predetermined curved direction along the curved surface portion is formed at the curved surface portion; an elastically deformable plate-shaped reinforcing member which reinforces a peripheral area of the opening at the curved surface portion, the reinforcing member being disposed in a curved state along an inner surface of the curved surface portion; and a pressing member which covers the peripheral area of the opening in a pressing state from an outer surface of the curved surface portion, wherein the reinforcing member includes a main body portion which overlaps with the pressing member and sandwiches the skin in cooperation with the pressing member, and an extending portion which is connected to at least one side edge of the main body portion in a width direction orthogonal to the curved direction and extends in a range not overlapping with the pressing member, a slit is formed in the extending portion, and the slit extends in the curved direction such that a portion of the extending portion an outer side in the width direction is elastically deformable independently from the main body portion.

In such a configuration, the elastically deformable plate-shaped reinforcing member includes the main body portion overlapping with the pressing member and sandwiching the skin in cooperation with the pressing member, and the extending portion connected to at least one side edge of the main body portion in the width direction orthogonal to the curved direction and extending in the range not overlapping with the pressing member, and the slit is formed in the extending portion. The slit extends in the curved direction such that the portion of the extending portion on the outer side in the width direction can be elastically deformed independently from the main body portion. Accordingly, the extending portion of the reinforcing member is elastically deformable independently from the main body portion due to the formation of the slit. As a result, the extending portion of the reinforcing member easily follows the curved surface portion of the skin. Accordingly, the extending portion pushes the curved surface portion outward along the curved surface portion of the skin and hence, generation of wrinkles in the curved surface portion can be suppressed.

In the above-mentioned seat, it is preferable that the reinforcing member be formed of a thermoplastic resin plate.

According to such a configuration, the reinforcing member is formed of the thermoplastic resin plate and hence, the reinforcing member can be easily bent along the curved surface portion of the skin, and has bending rigidity capable of pushing the curved surface portion outward.

In the above-mentioned seat, it is preferable that the opening be formed at a position close to a side edge of the seat, and the slit is formed such that both ends of the slit in the longitudinal direction of the slit are closed within a range of the reinforcing member sandwiched between the side edge of the seat and the opening.

With such a configuration, when the opening of the skin is formed at a position close to the side edge of the seat, within a narrow range sandwiched between the opening and the side edge of the seat, wrinkles tend to be easily generated in the skin clue to poor moldability of a covering target (pad or the like) covered by the skin, or the like. Therefore, as described above, within the range of the reinforcing member sandwiched between the side edge of the seat and the opening, the slit is formed such that both ends of the slit in the longitudinal direction of the slit are closed and hence, the extending portion of the reinforcing member is supported by the main body portion at two positions close to the both ends of the slit (that is, supported at both ends thereof). With such a configuration, the bending rigidity of the extending portion is increased, and it is possible to suppress the generation of wrinkles within the range sandwiched between the opening in the skin and the side edge of the seat with certainty.

In the above-mentioned seat, it is preferable that the slit be formed at a position, in the reinforcing member, adjacent to a peripheral edge of the pressing member overlapping with the main body portion.

With such a configuration, the slit is formed at the position adjacent to the peripheral edge of the pressing member and hence, it is possible to decrease a distance between the peripheral edge of the pressing member and a portion of the curved surface portion of the skin pushed outward by the extending portion. As a result, it is possible to enhance the external appearance of the skin by eliminating the portion where the reinforcing member does not follow the skin.

In the above-mentioned seat, it is preferable that the extending portion of the reinforcing member extend from side edges on both sides in the width direction of the main body portion, and the slit is firmed in each extending portion.

With such a configuration, the extending portions of the reinforcing member respectively extend from side edges on both sides in the width direction of the main body portion, and the extending portions are respectively elastically deformable independently from the main body portion due to the slit foo ted in each of the extending portion. Accordingly, it is possible to suppress the generation of wrinkles in the curved surface portion of the skin by the extending portions on both sides of the reinforcing member.

In the above-mentioned seat, it is preferable that the main body portion be seamed to the skin.

With such a configuration, the main body portion of the reinforcing, member overlaps with the pressing member disposed outside the skin, and the main body portion is seamed to the skin and hence, the seamed portion is covered by the pressing member, so that the seamed potion cannot be seen from the outside. As a result, it is possible to prevent deterioration of appearance of the skin.

In the above-mentioned seat, it is preferable that the opening have a size which allows the insertion of a connector of a child seat thus allowing the attachment of the child seat to the seat.

With such a configuration, the opening has a size which allows insertion of the connector of the child seat and hence, it is possible to allow the attachment of the child seat to the seat. Accordingly, it possible to suppress the generation of wrinkles on the skin around the opening of the seat for inserting the connector of the child seat.

According to the seat of the present embodiment, it is possible to suppress the generation of wrinkles around the opening of the curved surface portion of the skin.

The invention claimed is:

1. A seat comprising:
a skin which has a curved surface portion at least at a part thereof and in which an opening curved in a predetermined curved direction along the curved surface portion is formed at the curved surface portion;
an elastically deformable plate-shaped reinforcing member which reinforces a peripheral area of the opening at the curved surface portion, the reinforcing member being disposed in a curved state along an inner surface of the curved surface portion; and
a pressing member which covers the peripheral area of the opening in a pressing state from an outer surface of the curved surface portion,
wherein the reinforcing member includes a main body portion which overlaps with the pressing member and sandwiches the skin in cooperation with the pressing member, and an extending portion which is connected to at least one side edge of the main body portion in a width direction orthogonal to the curved direction and extends in a range not overlapping with the pressing member,
a slit is formed in the extending portion, and
the slit extends in the curved direction such that a part of the extending portion on an outer side in the width direction is elastically deformable independently from the main body portion.

2. The seat according to claim 1, wherein the reinforcing member is formed of a thermoplastic resin plate.

3. The seat according to claim 2, wherein
the opening is formed at a position close to a side edge of the seat, and
the slit is formed such that both ends of the slit in a longitudinal direction of the slit are closed within a range of the reinforcing member sandwiched between a side edge of the seat and the opening.

4. The seat according to claim 2, wherein the slit is formed at a position adjacent to a peripheral edge of the pressing member overlapping with the main body portion in the reinforcing member.

5. The seat according to claim 2, wherein
the extending portion of the reinforcing member extends from side edges on both sides in the width direction of the main body portion, and
the slit is formed in each of the extending portions.

6. The seat according to claim 2, wherein the main body portion is seamed to the skin.

7. The seat according to claim 1, wherein
the opening is formed at a position close to a side edge of the seat, and
the slit is formed such that both ends of the slit in a longitudinal direction of the slit are closed within a range of the reinforcing member sandwiched between a side edge of the seat and the opening.

8. The seat according to claim 7, wherein the slit is formed at a position adjacent to a peripheral edge of the pressing member overlapping with the main body portion in the reinforcing member.

9. The seat according to claim 7, wherein
the extending portion of the reinforcing member extends from side edges on both sides in the width direction of the main body portion, and
the slit is formed in each of the extending portions.

10. The seat according to claim 7, wherein the main body portion is seamed to the skin.

11. The seat according to claim 7, wherein the opening has a size which allows insertion of a connector of a child seat thus allowing attachment of the child seat to the seat.

12. The seat according to claim 1, wherein the slit is formed at a position adjacent to a peripheral edge of the pressing member overlapping with the main body portion in the reinforcing member.

13. The seat according to claim 12, wherein
the extending portion of the reinforcing member extends from side edges on both sides in the width direction of the main body portion, and
the slit is formed in each of the extending portions.

14. The seat according to claim 12, wherein the main body portion is seamed to the skin.

15. The seat according to claim 12, wherein the opening has a size which allows insertion of a connector of a child seat thus allowing attachment of the child seat to the seat.

16. The seat according to claim 1, wherein
the extending portion of the reinforcing member extends from side edges on both sides in the width direction of the main body portion, and
the slit is formed in each of the extending portions.

17. The seat according to claim 16, wherein the main body portion is seamed to the skin.

18. The seat according to claim 16, wherein the opening has a size which allows insertion of a connector of a child seat thus allowing attachment of the child seat to the seat.

19. The seat according to claim 1, wherein the main body portion is seamed to the skin.

20. The seat according to claim 1, wherein the opening has a size which allows insertion of a connector of a child seat thus allowing attachment of the child seat to the seat.

* * * * *